June 1, 1965 W. W. CARDIN 3,187,248
POWER TOOL OVERLOAD PROTECTION
Filed June 21, 1961
2 Sheets-Sheet 1
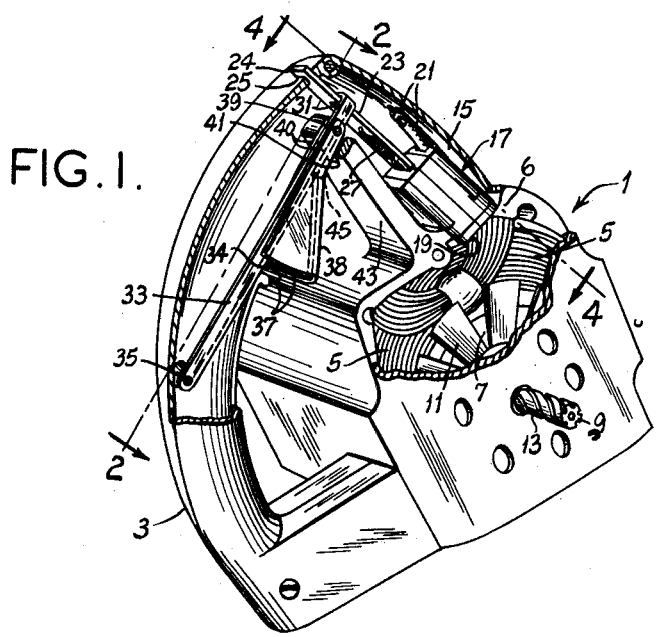
FIG. 1.
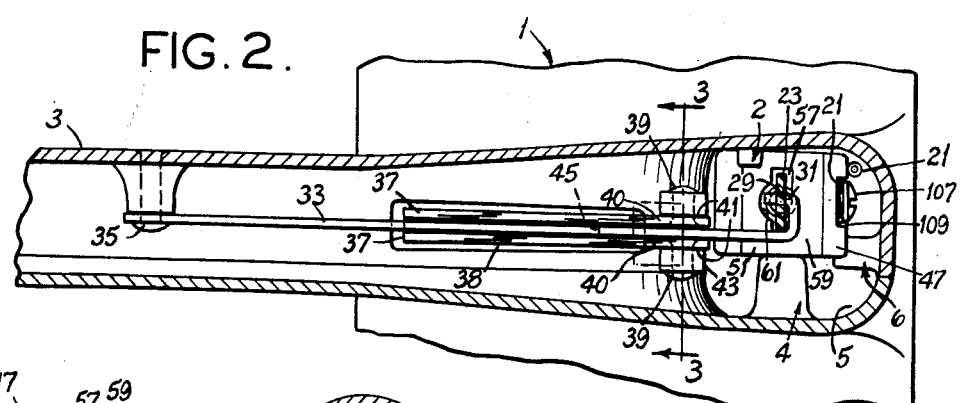
FIG. 2.
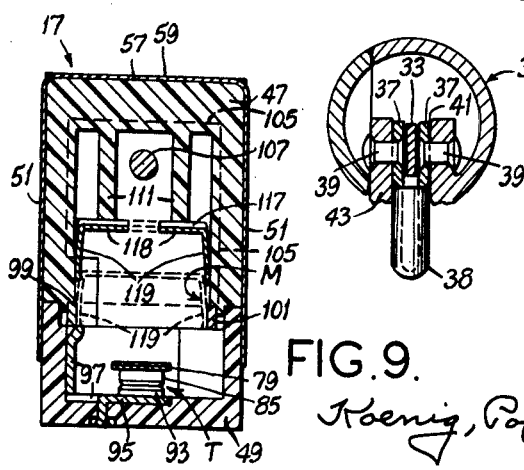
FIG. 3.
FIG. 9.
Wilfred W. Cardin,
Inventor.
Koenig, Pope, Senniger and Powers,
Attorneys.

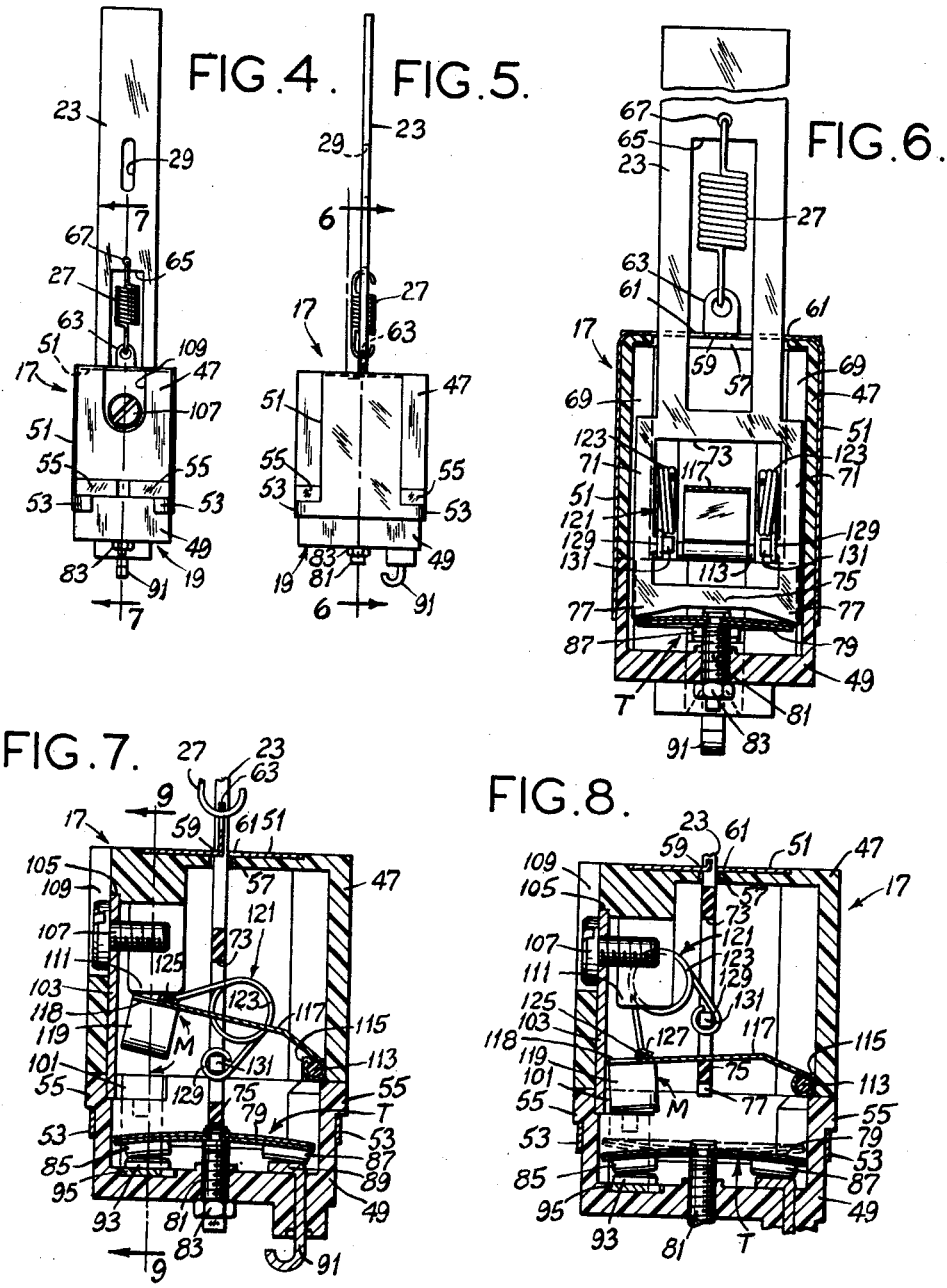

United States Patent Office 3,187,248
Patented June 1, 1965

3,187,248
POWER TOOL OVERLOAD PROTECTION
Wilfred W. Cardin, Attleboro, Mass., assignor to Texas Instruments Incorporated, Dallas, Tex., a corporation of Delaware
Filed June 21, 1961, Ser. No. 118,636
18 Claims. (Cl. 318—473)

This invention relates to power tool overload protection and with regard to certain more specific features, to thermostatic overload switch protection for portable electric power tools and the like.

Among the several objects of the invention may be noted the provision of fool-proof thermostatic protective devices particularly suited for, electric power tool devices such as portable saws, drills, sanders, buffers and the like; the provision of conveniently located trip-free combination control and protective switch means for electric windings of such devices; the provision of protective devices of the class described operated by a spring-return member employed thereon so as to become responsive to winding overload conditions; the provision of devices of the class described which require trigger release before a tool can be restarted after protective stoppage; and the provision of a device of this class which provides for rapid cooling of a tool winding after overload relief to provide means for quickly returning a tool to normal operating condition. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which one of various possible embodiments of the invention is illustrated, FIG. 1 is an isometric view of a portion of a power tool showing application of the invention thereto, parts being broken away;

FIG. 2 is an enlarged section taken on line 2—2 of FIG. 1;

FIG. 3 is a cross section taken on line 3—3 of FIG. 2;

FIG. 4 is an end elevation of a switch made according to the invention;

FIG. 5 is a side elevation;

FIG. 6 is an enlarged section taken on line 6—6 of FIG. 5, showing certain manual switch parts in open position, certain thermostatic switch parts being in closed position;

FIG. 7 is an enlarged section taken on line 7—7 of FIG. 4, also showing said manual switch parts in open position;

FIG. 8 is a view similar to FIG. 9, showing said manual switch parts in closed position, the dotted lines including an alternative open position of a thermostatic switch part; and FIG. 9 is a section taken on line 9—9 of FIG. 7, an alternate dotted-line position of a switch blade being shown.

Corresponding reference characters indicate corresponding parts throughout the several views of the drawings.

Various portable electric power tools such as saws, drills, sanders and the like have motor drives connected in circuits through an off-on switch operated by a trigger. The trigger is arranged to be squeezed to start the motor and biased to an open position to stop the motor when the operator releases the trigger. The trigger is usually organized with a suitable handle for the tool for convenient manipulation when the tool is held for use. The motors of such tools are sometimes subject to heavy overload or locked rotor conditions for times long enough to overheat the motor winding if a trigger is held in an on position long enough. By means of the present invention, the prior convenient organization of the handle and the trigger for starting and operating operations is preserved, while at the same time introducing a fool-proof thermostatic protective means against overload.

Briefly, the invention involves an organization including a trigger-operated manual switch and a thermostatic switch arranged in series-circuit relationship with the motor or like winding. A manually controlled, trigger-operated member is spring-biased to an initial position to open the manual switch and at the same time hold the thermostatic switch in closed position. Said member, by means of the trigger, may be manually operated against the spring bias to close the manual switch and disengage from the thermostatic switch, so that the latter may perform its protective function. The arrangement is such that a conventional or simple type of trigger device may be employed on the power tool to move the manually controlled operating member against said spring bias. Both the manual and thermostatic switches form a series connection with the motor winding when the trigger is manually actuated. At this time the thermostatic switch is free to open protectively, if needed. When the trigger is released and permitted to return to its initial position, the manual switch opens and the thermostatic switch, if it has opened in performance of its protective function, will also be returned to its closed position by the action of the operating member.

Referring now more particularly to FIGS. 1-3 of the drawings, there is shown fragmentarily at numeral 1 the casing of a typical power tool such as a power saw, having a typical handle 3. Within the casing 1 are located the usual motor driving parts, including motor windings 5, and an armature 7 on a drive shaft 9. Shaft 9 also supports and turns a cooling fan 11. The end of shaft 9 may be formed as a helical pinion gear 13, forming the input of a gear-reduction unit (not shown) which is bolted to the front of the casing 1. The output member of the gear-reduction unit supports a circular saw (not shown). The gear-reduction unit, saw blade and other appurtenances such as the saw guard cutting guides, etc., are not shown, being known. The handle is hollow, including a hollow portion such as that shown at 15 terminating adjacent the motor windings 5.

At numeral 17 is shown in general a switch assembly made according to the invention. This is located in the hollow portion 15, being held in fixed position by lugs 2, 4 and 6. One end 19 thereof is preferably in close proximity to said windings 5. In this end is a temperature-sensitive thermostatic switch, to be described. This is subject to heating by the windings by current flow therethrough. By means of suitable wires 21, the assembly 17 is connected in the circuit which serves to excite these windings. As will be shown below in detail, the switch assembly 17 includes a reciprocable operating stem or slider member 23.

Member 23 has a sliding end support in a slot 25 in the handle and (as will appear in more detail below) is biased toward the thermostatic switch in end 19, by means of a tension coil spring 27. The member 23 is provided with an outside opening 29 (FIG. 2) for the reception of the hooked end 31 of a rocker arm 33, the latter being pivoted at 35 within the handle 3. This rocker arm 33 is located in a slot 34 between spaced sides 37 of a trigger 38. Extension arms 40 of the sides 37 are pivoted, as shown at 39, in a bifurcation 41 located at the end of a supporting pillar 43 extending from the motor casing 1. An inner ledge 45 forms the end of the juncture between the trigger sides 37. This ledge engages the bottom of the rocker 33. Thus an operator's hand, which is supporting the power tool by handle 3, can squeeze the trigger 38 so as to lift the rocker 33 to drive the switch-operating member 23 outward against the bias of spring 27 as it stretches. When the trigger is released, the spring 27 pulls in the operating member 23. This places the rocker 33 and the trigger 38 in their initial positions.

Referring now more particularly to FIGS. 4–9, the safety switch means 17 comprises a housing or casing consisting of two insulating parts 47 and 49. These are held together by an exterior metal strap 51 of general U-shape passing around part 47 and provided at its lower end with spring finger clips 53, engaging under lugs 55 on part 49. The upper end of member 47 is slotted as shown at 57. A crossover portion 59 of the U-shaped strap member 51 is adjacently slotted, as shown at 61. This cross-over portion is struck out to form an eye 63 for anchoring one end of the spring 27. The slots 57 and 61 accommodate movement of the operating slide member 23. Member 23 has an opening 65 therein, accommodating the spring 27 and lug 63. At the upper end of the opening 65 is an anchor hole 67 for the spring 27.

The housing part 47 has transverse internal grooves 69 for the reception of sides 71 of a window-shaped portion 73 of the slide 23. An end sill 75 of the window portion 73 forms disc-engaging fingers 77. A thermostatic plate or disc engaged thereby is shown at 79. This disc is, for example, of the bimetallic thermostatic snap-acting, manual-reset variety, centrally mounted on a post 81 which is adjustably threaded in the lower end of member 49. A lock nut 83 maintains adjustment. The spring 27 tends normally to pull in the slider 23, so that the fingers 77 marginally engage the disc 79. Thus the disc 79 is held in what may be referred to as its contacts-closed or cold position. Thus slider 23 is biased by spring 27 for movement into engagement with disc 79 for resetting of the latter.

The disc 79 is provided with opposite movable contacts 85 and 87, located in a plane normal to the plane of action of fingers 77 on slider 23. The movable contact 87 engages a fixed contact 89, forming the inner end of a terminal 91 for one of the wires 21. The other movable contact 85 engages a fixed contact 93. Contact 93 is carried on a conductive member 95 (see FIG. 9). A right-angular extending portion 97 of member 95 forms contact 99 of a manual switch. The other and opposite contact of this manual switch is shown at 101. This contact 101 extends from a conductive plate 103, carried in grooves 105 in one side of the housing member 47. The plate 103 is provided with a threaded terminal screw 107, access to which is obtained through an opening 109 in the member 47. Screw 107 fastens the other wire 21.

Extending from the upper end of housing member 47 is a pair of insulating stops 111. At numeral 113 is shown a pivot pin, supported in notches 115 in housing member 47 and pivotally supporting a switch arm 117. The opposite end of the switch arm 117 is formed as a conductive U-shaped transverse blade member 118 having spring contact fingers 119. When the switch arm 117 is up, as shown in FIG. 7, the blade 118 engages stops 111 (see also the solid-line position of the blade in FIG. 9). When the blade 118 is down, as shown in FIG. 8, the switch fingers 119 engage the contacts 99 and 101.

When the slide 23 is pulled inward by spring 27, as shown in FIG. 6, the blade 118 becomes disengaged from the contacts 99, 101. When the slide 23 is pulled out against the bias of spring 27 (as by pressing trigger 38), the blade 118 engages contacts 99, 101, as shown in FIG. 8. To accomplish this, an overcentering spring 121 is provided, having side loops 123 connected by a cross-wire 125, which passes through a pivot clip 127 on the end of switch arm 117. Each side loop 123 is anchored, as shown at 129, to a lug 131 extending inward from the side of window 73 in the slide 23. Thus when slide 23 is down, as shown in FIG. 7, spring 121 reacts by overcentering to move the switch arm 117 to open position. When the slide is up, as shown in FIG. 8, the spring 121 reacts to move the switch blade 118 to switch-closed position. Hence manual switch-opening and -closing is with snap action, occasioned by the movement of the lugs 131 across a line drawn through the center lines of pin 113 and of cross-wire 125.

It will be observed also that when the slider 23 is pulled down by spring 27 (FIG. 7), fingers 77 hold the disc 79 in its contacts-closed position. This occurs when the blade 118 is in its contacts-open position. When the slide 23 is up (FIG. 8) the fingers 77 retract from the disc 79 and blade 118 assumes its contacts-closed position (FIG. 8). Then the thermostatic disc 79 may remain in its contacts-closed position if cold, or it may upon heating snap to its contacts-open position, as shown by the dotted lines in FIG. 8. In FIG. 9 the solid-line position of blade 118 corresponds to that shown in FIG. 7 and its dotted-line position corresponds to that shown in FIG. 8.

It will be noted that the thermostatic disc 79, by reason of its endwise position in housing 47, 49 is located in close heat-exchange relationship to the motor windings 5. Hereinafter the switch constituted by the disc 79 and contacts 85, 87, 89 and 93 will be referred to as a manual-reset thermostatic switch T. The switch constituted by switch arm 117, blade 118, contact parts 119, 99 and 101, and the spring 121, will be referred to as a manual control switch M. These switches T and M are in series-circuit relationship between the motor windings 5 and the line.

Operation is as follows, assuming a normal cool motor condition wherein the thermostatic switch T is in its solid-line contacts-closed condition, and assuming that the trigger 38 is released, so that the slider 23 is pulled down by spring 27, thus placing manual switch M in its contacts-open condition:

The operator picks up the tool, for example a power saw, squeezing the trigger 38 to move the slide 23 up to the position shown in FIG. 8. Both switches T and M are then in their contacts-closed conditions. The saw then operates as is usual. Disc 79 is free of restraint by fingers 77. As long as the motor remains sufficiently cool, the disc 79 remains in its solid-line position shown in FIG. 8.

When overload current flows in winding 5, as by the effect of too great a saw advance, or a locked rotor caused, for example, by sticking in a knot, the resulting overheating due to excess current in the windings 5 and in the disc 79 will heat the disc to snap it into its dotted-line contacts-open position shown in FIG. 8. This de-energizes the motor. Then the operator may work the saw blade loose, either while still squeezing the trigger 38 or upon releasing it. If it is released, the slide 23 becomes drawn in by spring 27. This causes fingers 77 to push the disc 79 from the dotted-line contacts-open position shown in FIG. 8 to its solid-line contacts-closed position, thus reclosing the thermostatic switch T against its tendency to remain open when hot. However, just before switch T closes the manual switch M has tripped open, so that the motor does not restart. Motor restarting requires a subsequent squeeze on the trigger 38.

After the tool is cleared from that which caused the overload or locked rotor, the operator may immediately try to restart the motor by squeezing on the trigger 38. This pulls up the slide 23 and recloses the manual switch M (FIG. 8). If the motor winding is still too hot, the thermostatic switch T will reopen (see the dotted lines, FIG. 8). Several closely sequenced trials may be made, as is likely if the operator is impatient. When the windings 5 have cooled sufficiently, the thermostatic switch will remain closed upon squeezing the trigger 38, which is to say, under free-running idling operation of the saw or other tool. In order that the saw will not trip out upon reapplying the saw to the work under a normal load condition, the operator is instructed to hold the tool away from the work while holding in the trigger 38. The resulting free running of the saw involves actuation of the fan 11, which causes rapid cooling of windings 5 to a condition under which heating due to normal loading will not trip open the thermostatic switch T. Thus the motor may be prepared within several seconds to run under normal load conditions. This constitutes an important advantage of the invention, permitting more useful work to be done by the tool in a given time.

Another advantage is the convenient location in the handle of the tool with the disc-end of the switch assembly close to the motor windings, so as to be rapidly responsive to overheating and also rapidly responsive to cooling by air flow from fan 11 through the motor for a rapid return to normal operating conditions. It will be understood that the lower end of the switch assembly 17 is in the air flow. Another advantage is that the device is trip-free, in the sense that when the thermostatic switch T trips open due to overload, it cannot be reclosed into a live circuit, noting that no resetting of the disc to its contacts-closed position is possible until the trigger is released to the contacts-open position of switch M. The fast reset operation obtained permits more useful work to be done with the tool.

Although the tool described herein has been described as having a trigger for starting purposes, it will be understood that this may be a starting device having other names, such as a starting button, lever or the like which may in general be called a starting member. While the windings of the saw described form part of its motor, it will be understood that some tools may employ windings of other power devices such as vibrators or the like, and all such windings and power devices are contemplated herein.

As is apparent from the above description, spring 27 is designed with sufficient force to move the disc 79 to its contacts-closed condition from its semi-hot condition which exists shortly after the circuit is opened. If desired, the strength of this spring may be reduced so that it is not forceful enough to reset the disc under such semi-hot conditions but only under less hot conditions. In such case the operator may supply the extra force needed by pressing down upon the exposed end 24 of the slider 23 in order to bring about resetting of the disc 79 from semi-hot conditions. This alternative still allows the tool to be restarted as above described by releasing trigger 38 upon the disc reaching lower temperatures. In addition, it allows attempts to start the tool quickly under idling conditions (to restart the fan) by pressing in the end 24 of the slider 23 under the stated semi-hot conditions.

It is to be understood that the invention is applicable to and has advantages on tools which do not employ cooling fans, although in such cases restarting times may be longer.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A thermostatic control and safety switch comprising terminals, a thermostatic switch and a manually operable switch adapted when both are closed to form a conductive circuit between said terminals, a manually operable member adapted to move the manually operable switch between circuit-open and -closed positions, said manually operable member including means cooperating with the thermostatic switch to hold it in closed-circuit condition when the manually operable switch is open and to retract from the thermostatic switch when the manually operable switch is closed to permit the thermostatic switch to open in response to temperature change.

2. A switch according to claim 1, including spring means biasing said manually operable member in a direction to open the manually operable switch.

3. A thermostatic control device according to claim 2, wherein said thermostatic switch is of the snap-acting type and including overcentering means connecting the manually movable member and the manually operable switch adapted to operate the manually operable switch with snap action in response to actuation in either opening or closing direction by said movable member.

4. An electric power tool comprising an electric winding subject to overload heating current, a manual starting member, a control switch, a manual reset thermostatic switch, said switches being in series-circuit arrangement with one another and said winding, a movable member adapted when moved in a first direction to open the control switch and reset the thermostatic switch to closed position, and when moved in a second and opposite direction to close the control switch and release the thermostatic switch for free thermostatic opening action thereof, means biasing said movable member for movement in said first-named direction, and means connecting said movable member and said manual starting member adapted upon manual actuation of the starting member to move the movable member in said second direction against the biasing action of said biasing means.

5. An electric power tool according to claim 4, including means connecting said movable member and said control switch adapted to move the control switch with snap action upon opening and closing.

6. An electric power tool according to claim 5, wherein said thermostatic switch is of the snap-acting plate type and the connection between it and said movable member consists of plate-engaging and -disengaging members on the movable member.

7. An electric power tool according to claim 6, including means on said movable member which is accessible and adapted for actuation thereof independently of said manual starting member.

8. An electric power tool according to claim 4, wherein said thermostatic switch is in close heat-exchange relation to said winding.

9. An electric power tool according to claim 4, wherein said winding constitutes a motor winding and a fan driven by the motor, and wherein said thermostatic switch is located in heat-exchange relation to said winding and in flow of air from said fan.

10. An electric power tool comprising a motor casing, a hollow handle thereon, an electric winding therein subject to overload current, a manual starting member on said handle, a switch assembly in the handle, said switch assembly comprising a manual control switch, a manual reset thermostatic switch, said switches being in series-circuit arrangement with one another and with said winding, said thermostatic switch being located in heat-exchange relationship with said winding, a movable member operatively connected with said manual control switch adapted when moved in a first direction to open the control switch and reset the thermostatic switch to closed position, and when moved in a second and opposite direction to close the control switch and release the thermostatic switch for free thermostatic opening action of the latter, means biasing said movable member for movement in said first-named direction, and means in said handle connecting said movable member and said manual starting member adapted upon manual actuation of the starting member to move the movable member in said second direction against the biasing action of said biasing means.

11. An electric power tool according to claim 10, wherein said movable member moves in the handle and wherein said handle includes an opening from which extends a portion of said movable member for manual access thereto.

12. An electric power tool comprising an electric winding subject to overload heating current, a manual starting member, a manual control switch, a snap-acting manual reset thermostatic switch, said switches being in series-circuit arrangement with one another and with said winding, a movable member operatively connected with said manual control switch through an overcentering spring means adapted when moved in a first direction to open the control switch with snap action and reset the thermostatic switch to closed position, and when moved in a second and opposite direction to close the control switch with snap action and release the thermostatic switch to permit free thermostatic snap-acting opening action of the latter, means biasing said movable member for movement in said first-named direction, and a mechanism connecting said movable member and said manual starting member adapted upon manual actuation of the starting member to move the movable member in said second direction against the biasing action of said biasing means.

13. Safety switch means comprising a casing, means supporting therein a thermostatic switch including a manual reset type of thermostatic plate, an operating slider having means engageable and disengageable with said plate to reset it when engaged from a hot circuit-open condition to a cold circuit-closed condition and to free it for thermostatic action to circuit-open condition when disengaged, spring means mounted for reaction between the casing and the slider to bias the latter toward engagement with said plate, a manual control switch in the casing, overcentering spring means connecting the slider and said control switch adapted for snap action of the control switch to closed-circuit position when the slider is moved away from the plate and to open-circuit position when biased by said spring means toward engagement with the plate.

14. Safety switch means comprising a housing, a thermostatic switch including a manual reset type of thermostatic plate carrying first movable contacts in one plane for engagement with first fixed contacts on the housing, a slider extending through an opening in the housing and having inside means engageable and disengageable with points on said plate in a plane perpendicular to the plane of movement of said movable contacts, a switch arm pivoted to the housing and carrying second movable contacts engageable and disengageable with second fixed contacts on the housing, said switch arm being movable in a plane parallel to that of the first movable contacts on the plate, over-centering spring means connected between said switch arm and said slider, biasing spring means, means anchoring one part of the biasing spring means relative to the housing and means anchoring another part of the biasing spring means to the slider, the bias of the biasing spring means being adapted to drive the slider into engagement with the plate, said overcentering spring means being adapted to drive the switch arm to disengage the second movable contacts thereon from said second fixed contacts when the slider engages the plate, and to drive the arm to engage the second movable contacts thereon with said second fixed contacts when the slider is disengaged from the plate.

15. Safety switch means comprising a housing, a thermostatic switch mounted at one end thereof and including a manual reset type of thermostatic disc and carrying first movable contacts in one plane for engagement with first fixed contacts on the housing, a slider plate extending through an opening at the opposite end of the housing and having means at its inner end engageable and disengageable with points on said plate in a plane perpendicular to the plane of movement of said first movable contacts, a switch arm pivoted on one side of the housing and carrying second movable contacts upon the other side thereof engageable with second fixed contacts on the housing, said switch arm being movable substantially in the plane of movement of the movable contacts, said slider plate having an opening therein accommodating movement of said switch arm, overcentering spring means connected between said switch arm and said slider plate, a tension coil spring, means adjacent said opening in the housing anchoring one end of said coil spring, said slider plate having a second opening accommodating said coil spring, and anchoring means for the other end of the coil spring adjacent one portion of the last-mentioned opening.

16. In combination, a power tool having an operating trigger and a fan-cooled motor winding, a protective starting and stopping switch assembly located in the air path of the fan and including terminals connecting the motor winding with a supply circuit, said assembly also including a thermostatic switch and a manual switch adapted for series-circuit connection between said terminals, said thermostatic switch being located in close heat-exchange relation to the motor winding, a movable member extending from said assembly, means operatively connecting the movable member with both switches, means biasing the movable member to hold the thermostatic switch closed while opening the manual switch, and means connecting the trigger with said movable member to move it against said bias when the trigger is squeezed to close the manual switch while freeing the thermostatic switch to operate thermostatically.

17. The combination according to claim 16, wherein said thermostatic switch is of the snap-acting type, and including overcentering spring means connecting said movable member and the manual switch adapted to actuate the latter with snap action during its opening and closing movements.

18. A control device for an electric power tool comprising an electric winding subject to overload heating current, said device comprising a manual starting member, a control switch, a manual reset thermostatic switch, said switches being in series-circuit arrangement with one another and adapted for series connection with said winding, a movable member adapted when moved in a first direction to open the control switch and reset the thermostatic switch to closed position, and when moved in a second and opposite direction to close the control switch and release the thermostatic switch for free thermostatic opening action thereof, means biasing said movable member for movement in said first-named direction, and means for connecting said movable member and said manual starting member whereby upon manual actuation of the starting member the movable member will be moved in said second direction against the biasing action of said biasing means.

References Cited by the Examiner

UNITED STATES PATENTS 2,434,984   6/43   Bolesky et al. _____ 200—138.3
2,958,748   4/59   Barden et al. _____ 200—114.6

ORIS L. RADER, *Primary Examiner.*